United States Patent
Payami et al.

(10) Patent No.: US 12,095,532 B2
(45) Date of Patent: Sep. 17, 2024

(54) MULTI-ANTENNA BEAMFORMING

(71) Applicant: University of Surrey, Surrey (GB)

(72) Inventors: Sohail Payami, Guildford (GB);
Konstantinos Nikitopoulos, Guildford (GB); Rahim Tafazolli, Guildford (GB)

(73) Assignee: University of Surrey (GB)

( * ) Notice: Subject to any disclaimer, the term of this patent is extended or adjusted under 35 U.S.C. 154(b) by 225 days.

(21) Appl. No.: 17/641,809

(22) PCT Filed: Sep. 10, 2020

(86) PCT No.: PCT/GB2020/052184
§ 371 (c)(1),
(2) Date: Mar. 9, 2022

(87) PCT Pub. No.: WO2021/048551
PCT Pub. Date: Mar. 18, 2021

(65) Prior Publication Data
US 2022/0399922 A1    Dec. 15, 2022

(30) Foreign Application Priority Data
Sep. 10, 2019 (GB) .................................. 1913052

(51) Int. Cl.
*H04B 7/06* (2006.01)
(52) U.S. Cl.
CPC ................. *H04B 7/0617* (2013.01)
(58) Field of Classification Search
CPC .................................................. H04B 7/0617
USPC ....................................................... 375/262
See application file for complete search history.

(56) References Cited

U.S. PATENT DOCUMENTS

| 2011/0109507 A1* | 5/2011 | Warnick ............. H01Q 21/0025 342/368 |
| 2014/0203969 A1* | 7/2014 | Maltsev ............... H04B 7/0617 342/385 |
| 2018/0212590 A1 | 7/2018 | Shrivastava et al. |

FOREIGN PATENT DOCUMENTS

WO    2018091203 A1    5/2018

OTHER PUBLICATIONS

Bogale, T. E., et al., "On the Number of RF Chains and Phase Shifters, and Scheduling Design With Hybrid Analog-Digital Beamforming", IEEE Transactions on Wireless Communications, vol. 12, No. 5, May 2016.

(Continued)

*Primary Examiner* — Fitwi Y Hailegiorgis
(74) *Attorney, Agent, or Firm* — Rutan & Tucker, LLP; Kyle M. St. James

(57) ABSTRACT

A method and apparatus for transmitting a wireless signal using a beamforming apparatus having a plurality of antennas is disclosed. The technique comprises: generating a first RF signal; and transmitting, using the plurality of antennas, a corresponding plurality of output RF signals to form the transmitted wireless signal; wherein transmitting the plurality of output RF signals comprises, for each antenna: splitting the first RF signal into a pair of second RF signals; shifting a respective phase of each of the pair of second RF signals; adding the phase shifted pair of second RF signals to form a third RF signal; and transmitting, using the antenna, the third RF signal as the corresponding output RF signal for the antenna.

17 Claims, 6 Drawing Sheets

(56) References Cited

OTHER PUBLICATIONS

International Search Report and Written Opinion, PCT Aplication No. PCT/GB2020/052184, mailed Oct. 27, 2020.

* cited by examiner

MULTI-ANTENNA BEAMFORMING

PRIORITY

This application claims the benefit of and is a National Stage of PCT Application No. PCT/GB2020/052184, filed Sep. 10, 2020, which claims the benefit of priority to GB Patent Application No. 1913052.5, filed Sep. 10, 2019, both of which are incorporated in their entireties herein.

FIELD

The present invention relates to methods and apparatus for transmitting a wireless signal and, in particular, using a beamforming apparatus having a plurality of antennas.

BACKGROUND

In a wireless system, a transmitter can be equipped with single or multiple antennas to transmit one or more information streams at a particular time/frequency resource element. In order to convert the baseband signal to a radio frequency (RF) signal, RF chains are required that consist of electrical components, e.g., mixers and digital to analogue converters (DACs). In addition, power amplifiers are also used in wireless transmitters to assure that the signal power levels are sufficient to combat the power losses in the system.

In wireless systems, if the input signal to the power amplifier varies significantly, i.e., if the signal has a high peak-to-average-power ratio (PAPR), then the power level of the transmit signal needs to be backed-off from the saturation point of the power amplifier resulting in a lower average transmit power and consequently in a lower signal-to-noise ratio (SNR) at the receiver. Higher PAPR can impose larger backoff from the saturation point of the power amplifier to avoid signal distortion and to avoid spectrum leakage to out-of-band frequencies, which occurs due to nonlinear signal amplification. High PAPR values impose a real challenge in many practical systems that target spectrally efficient modulation techniques, e.g. orthogonal frequency division multiplexing (OFDM) with amplitude modulation schemes.

In spatial multiplexing, multi-antenna transmitters can transmit multiple information streams over the same time/frequency resources. In multiple-input multiple-output (MIMO) systems with N transmit and U receive antennas, the spatial multiplexing gain of the system depends on the rank of the U×N dimensional channel matrix. In such systems, increasing the number of the antennas on one side can result in better conditioned channels. As a result, linear precoding/combining methods with lower complexity can provide a good performance compared to more complex and near-optimal nonlinear methods. For example, in massive MIMO scenarios with U<<N, 'zero-forcing' provides a close to optimal performance in terms of spectral efficiency. In addition, equipping the transmitter and/or the receiver with a large number of antennas can provide an array gain that enhances SNR. However, having a dedicated radio frequency chain per antenna element, also referred as digital beamformer or a fully-digital system, increases the system cost, power consumption and complexity.

A fully-digital system with a dedicated RF chain per antenna is an expensive and power hungry solution, and so different structures and methods have been proposed to reduce the number of the RF chains. For example, hybrid beamforming systems have been proposed. However, this approach limits the number of the transmit streams to be smaller than the number of the RF chains.

Other competing technologies to reduce the number of the RF chains are: antenna selection with a switch network, electronically steerable parasitic antenna radiation (ESPAR), load modulated MIMO, outphasing MIMO, and analogue beamforming. However, each of these approaches introduces new design challenges which can dramatically affect the system design and performance in practice.

In ESPAR, one active element induces current in the parasitic elements. By changing the loads on the parasitic elements, the current in the antennas can be adjusted; hence the desired beam pattern can be created. If the loads are lossless (i.e., capacitance and inductance effects only), then only constant envelop modulation schemes can be supported. If resistors are also used, then different modulation orders can be supported but the whole system will have increased losses, as well. In ESPAR, spatial multiplexing gain of a higher order cannot be supported due to the small antenna spacing which also results in highly correlated channels. The parasitic elements in ESPAR are closely placed near the active element so that mutual coupling between the active and parasitic elements takes place. In this setting, the antenna spacing is less than half wavelength and this imposes constraints on the array geometry and size. If the spacing between the active and parasitic elements is increased, the coupling effect will become negligible and the system would not operate. As a result, this structure is mainly suitable for small arrays, e.g. handheld devices.

In load modulated MIMO systems the antennas are put at a larger distance from each other to avoid coupling. The loads on the antennas are directly connected to a single RF chain. Similarly to ESPAR, the current in the antennas will vary by changing loads. As a result, a desired beam pattern can be created. Although a single RF chain can be used to support more than one user if the loads vary according to the sample time, there are several challenges with this approach. First, an adaptive matching circuit is needed because changing the load on each antenna will result in a change in the currents on the other antennas. If perfect matching does not take place, a part of the signal will return to the amplifier. A circulator can be used, however, the returned signal will be dissipated which reduces the system power efficiency. The PAPR is also a problem for this method, since each of the loads will experience large signal variations. Hence, the overall power from the power amplifier needs to be reduced. In other words, although the power amplifier can theoretically generate a constant envelop signal, in practice a power back-off is required to handle current and voltage limits of the loads. The PAPR and the return losses will become small only if the number of antennas is very large, so this structure is mainly suitable for large antenna arrays. In addition, designing the point where the amplifier is connected to loads ("star-point") is a challenging task in practical systems.

In an outphasing MIMO configuration the phase shifter network has a tree structure with one phase shifter on each branch. In this approach, the return loss and also the matching network problems in load modulated MIMO can be solved by using "standard RF components", e.g., phase shifters, hybrid couplers. However, there are still several problems that are associated with this structure. First, as the number of the antennas grows large, the number of the power dividers to build the tree structure network also increases. As a result, the signal from the power amplifier will be constantly divided by two until it reaches the antennas. This implies that the signal may become too weak to reach the transmitter antennas. On the other hand, if a power amplifier is inserted on the tree, e.g., before each antenna, then that amplifier will experience a PAPR problem. In addition, the phase shifters at different branches of the tree need to have different power handling capabilities. For example, a larger amount of power will pass through the phase shifters that are closer to the power amplifier compared to the ones that are near the antennas. Sometimes in phased array antenna systems, it is preferred to put several low-cost low-power amplifiers before each of the antennas rather using one expensive high-power amplifier for the whole array.

The second challenge with the outphasing approach is that it requires solving a highly nonlinear and nonconvex problem (a multidimensional trigonometric problem) to find the phases of the phase shifters such that a desired signal can be created at the antennas. As a result, finding a solution to this problem becomes computationally expensive. In some cases, a suboptimal look up table approach has been proposed to speed up the process. It is noted that a look up table can be only defined for a specific scenario, e.g., specific number of antennas, resolution of phase shifters, waveform, propagation channel, etc. In other words, if a single parameter changes in the system, a new look up table will be needed. Moreover, increasing the number of the antennas will result in an even more complex problem both in terms of hardware implementation and the computational complexity to find the beamforming weights for each phase shifters.

The hardware difficulty with outphasing method is that a large number of phase shifters are needed for this structure. This increases the complexity of the circuitry to control the phase shifters. In order to have $N=2^K$ antennas in the outphasing approach, $N+\Sigma_{n=1}^{K}2^n$ phase shifters are needed. For example, 574 phase shifters are needed to have 64 antennas. This results in a dramatic increase in the computational complexity as well as the hardware overhead to control the phase shifters. Large number of phase shifters also increase the size and the power consumption of the transmitter front end. Furthermore, if one of the phase shifters in this structure breaks down, the error will propagate throughout the network and the system performance will be significantly affected.

Analogue and hybrid beamformers with a conventional phase shifter network are shown in FIG. 1 and FIG. 2. In such structures, a phase shifter network is used to connect the RF chains to the antenna array, and beamforming can partially take place in the RF domain via the phase shifters and partially in the baseband. One of the major bottlenecks of almost all of the hybrid beamforming approaches is that the spatial multiplexing gain is limited by the number of the RF chains. For example, IEEE 802.11 ad supports analogue beamforming and only offers single-stream transmission, but IEEE 802.11 ay allows the access point, which has a larger number of RF chains, to support spatial multiplexing of up to 8 streams to 8 users.

Studies on the capacity of MIMO channels indicate that the spatial multiplexing gain of the channel is limited by the rank of the propagation channel matrix. When there is enough scattering in the channel, the rank of the channel matrix is the minimum number of the antennas at the transmitter and receiver, i.e., min (U,N). This indicates that the conventional hybrid beamforming approaches are not able to utilize the full potential of MIMO channels. In addition, when fully-connected structures are used, as shown in FIG. 1, the power consumption and circuit complexity grows substantially with the number of the RF chains. Hence, achieving higher orders of spatial multiplexing gain in practical systems requires an extremely expensive and power hungry circuit.

In this context, there is a need for a low-cost, low-complexity and flexible approach for transmitters in wireless systems.

SUMMARY OF THE INVENTION

In a first aspect of the invention, a method of transmitting a wireless signal is provided using a beamforming apparatus having a plurality of antennas, the method comprising:
generating a first RF signal; and transmitting, using the plurality of antennas, a corresponding plurality of output RF signals to form the transmitted wireless signal;
wherein transmitting the plurality of output RF signals comprises, for each antenna:
splitting the first RF signal into a pair of second RF signals; shifting a respective phase of each of the pair of second RF signals; adding the phase shifted pair of second RF signals to form a third RF signal; and transmitting, using the antenna, the third RF signal as the corresponding output RF signal for the antenna.

In a second aspect of the invention, a beamforming apparatus for transmitting a wireless signal is provided comprising: a baseband signal generator configured to generate a first RF signal; a plurality of antennas configured to transmit a corresponding plurality of output RF signals to form the transmitted wireless signal; and for each of the plurality of antennas: a signal splitter configured to split the first RF signal into a pair of second RF signals; at least two phase shifters configured to shift a respective phase of each of the pair of second RF signals; a signal adder configured to add the phase shifted pair of second RF signals to form a third RF signal and output the third RF signal as the corresponding output RF signal for the antenna.

Shifting the phase may be based on a desired vector for the third RF signal.

The desired vector may be determined based on a beam forming calculation for the plurality of antennas.

The respective phases for each of the phase shifted pair of second RF signals may be selected such that vector average of the second RF signals is substantially aligned with a desired direction of the desired vector for the third RF signal.

Shifting the respective phase of each of the pair of second RF signals may comprise:
determining a desired phase shift for each of the pair of second RF signals based on the desired vector for the third RF signal; determining an applicable phase shift by rounding the desired phase shift to a nearest discrete phase available to a digital phase shifter; and shifting the respective phase of each of the pair of second RF signals by the applicable phase shift using a digital phase shifter.

The method may further comprise adjusting a baseband coefficient of the first RF signal.

The method may further comprise amplifying the first RF signal before splitting the first RF signal, wherein shifting a respective phase of each of the pair of second RF signals for each antenna is based on a desired envelop of the plurality of output signals.

The method may further comprise amplifying each of the third RF signals prior to transmitting the plurality of output signals.

Shifting the respective phase of each of the pair of second RF signals may comprise shifting the phase using each of a plurality of phase shifters arranged in series.

The method may further comprise sequentially updating the transmitted wireless signal by updating a phase shift applied by each phase shifter in the plurality of phase shifters in sequence, for each plurality of phase shifters.

Shifting the respective phase of each of the pair of second RF signals may comprise shifting the phase using one of a plurality of phase shifters arranged in parallel.

The method may further comprise sequentially updating the transmitted wireless signal by selecting each phase shifter in the plurality of phase shifters in sequence, for each plurality of phase shifters.

The method may further comprise generating at least one additional first RF signal, wherein a total number of the plurality of antennas is greater than a total number of the first RF signals.

The details of one or more implementations are set forth in the accompanying drawings and the description below. Other features, objects, and advantages will be apparent from the description and drawings, and from the claims.

DETAILED DESCRIPTION

Figure 1:
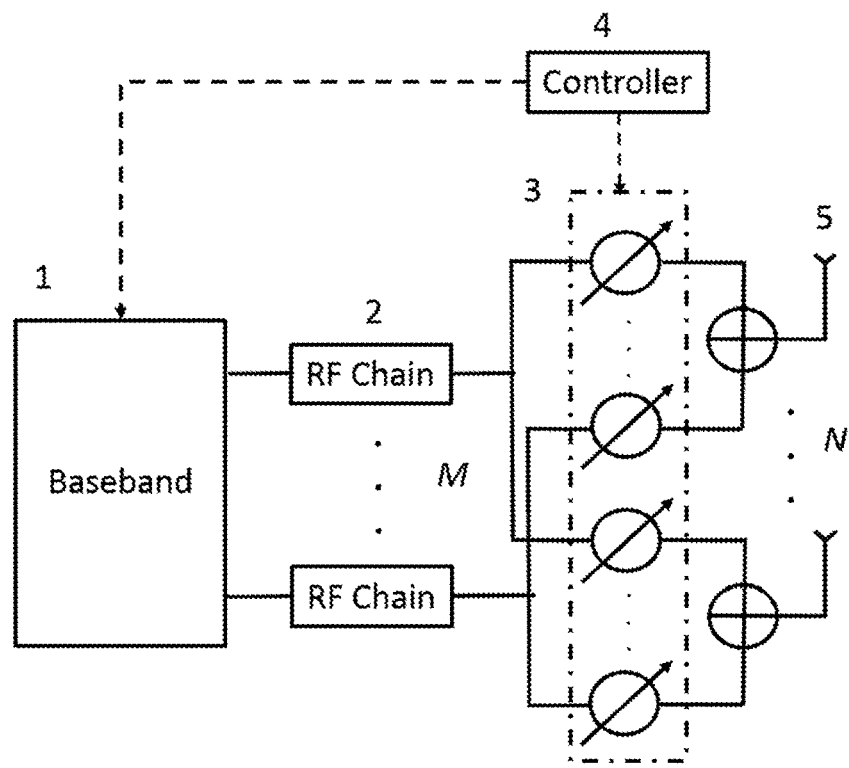
FIG. 1 is the block diagram of a fully-connected hybrid beamformer at the transmitter.

Techniques of the present disclosure enable the creation of signals that can result in higher orders of spatial multiplexing gain compared to the number of the RF chains. This approach can also be applied to any transmitter structure to reduce the PAPR of the input signals to the power amplifiers. This approach is applicable to many different scenarios such as single-user and multiuser MIMO, broadcast systems, satellite communications, etc.

Mathematical Principles

Consider a complex on number $x \in \mathbb{C}$, $x=x_r+jx_j=|x|e^{j\theta}$ where $x_r$ and $x_j$ are the real and imaginary parts of x, and $|x|$ and $e^{j\theta}$ denote the magnitude and phase of x. If $|x| \le 1$, then arithmetic average of two constant modulus complex numbers $x_1=e^{j\Theta_1}, x_2=e^{j\Theta_2}$ can be used to create x.

$x_1$ and $x_2$ belong to the unit circle on the complex plane, i.e. the unit circle that is characterized by $|x_1|^2=|x_2|^2=|x_{1,r}^2|+|x_{1,j}^2|=|x_{2,r}^2|+|x_{2,j}^2|=1$. In other words, there exists at least a pair $x_1$, $x_2$ such that $$x = \frac{1}{2} \times (x_1 + x_2).$$

To generalize this equation, by considering $|x| \le A$, a pair $x_1$, $x_2$ exists such that $$x = \frac{A}{2} \times (x_1 + x_2) = \frac{A}{2} \times e^{j\theta_1} + \frac{A}{2} \times e^{j\theta_2}.$$

The ½ term is equivalent to splitting a signal with magnitude/envelop A into two branches with equal magnitudes A/2. Then, $e^{j\Theta_1}$ and $e^{j\Theta_2}$ operations are applied to the signal on each branch, equivalent to a phase shifting operation by a phase shifter. Finally the addition sign "+", is equivalent to adding the two phase shifted signals together using a combiner/adder. This implies that any complex number, whose magnitude is smaller than A, can be constructed from a constant envelop signal with magnitude A, using two phase shifters (or the equivalent physical realisation of this operation, e.g., electrical component that provides phase shifting effect), a splitter, a combiner/adder (or the equivalent physical realisation of this operation, e.g., the equivalent electrical components).

Considering a vector x, for which the magnitude of its elements is limited to a certain level $x_{max}$; each element of x can be constructed using a constant envelop signal with $x_{max}$ as the maximum magnitude and two phase shifters and an adder per vector element.

System Model

A signal vector $s \in \mathbb{C}^{U \times 1}$ is the vector which contains the symbols that will be transmitted to the users. To combat the effects of the propagation channel, denoted by a propagation matrix $H \in \mathbb{C}^{U \times N}$, the signal vectors is mapped to a transmit vector $x \in \mathbb{C}^{N \times 1}$ such that the users can decode their messages based on the received signal vector $y \in \mathbb{C}^{U \times 1}$.

In the following description, only frequency-flat channels are described and both rich and sparse scattering channel scenarios are considered. The channel input-output relationship is expressed as y=Hx+z where z is normalized, independent and identically distributed (i.i.d.) and zero-mean and unit-variance additive white Gaussian noise vector.

To create the transmit vector x(H,s), the transmitter applies a beamforming technique depending on the performance metric, hardware structure and the availability of channel state information (CSI). In the following, the base station is assumed to have full CSI. The average transmit power over different symbol realizations for a given channel may be set to P.

In general, beamformers at the transmitter side may be divided into linear and nonlinear methods. In linear beamforming, the base station applies precoding matrix $F \in \mathbb{C}^{N \times U}$ to precode the signal vector s such that $x=\sqrt{\rho}Fs$, where $\rho=P/\gamma$ and $\gamma=\text{trace}(FF^H)$ is a normalization factor. Linear beamformers in MIMO systems generally have lower complexity and result in lower spectral efficiency compared to nonlinear schemes such as vector perturbation. In fully-digital massive MIMO systems, linear beamforming schemes such as zero forcing can also result in a near-optimal performance due to the favourable propagation conditions of the wireless channel. Hence, for the sake of simplicity and without loss of generality, the following assumes that U<<N. Zero forcing by the digital beamformers is considered as the performance upper-bound.

The disclosed method is still viable if the zero forcing precoder for frequency-flat channels is replaced by any other precoding technique, such as vector perturbation, or frequency-selective channels. In the following, $x_D = F_D s$ and $y_D = H x_D + z$, denote the transmit and received signal vectors when the base station is equipped with a fully-digital beamformer.

When the transmitter is equipped with hybrid beamforming structure, M RF chains are connected to N≥M antennas with a network of phase shifters. Hybrid structures can be generally divided into fully-connected and sub-connected structures. In the fully-connected structures each RF chain is connected to all of the antennas unlike the sub-connected configuration where each RF chain is connected to a subset of antennas. Compared to the sub-connected structure, the fully-connected approach can provide a higher spectral efficiency, higher array gain and more flexibility in terms of signal processing due to the availability of larger number of phase shifters. However, the complexity and power consumption of its circuitry significantly increases when the number of the RF chains and consequently the number of the required phase shifters increase.

FIG. 1 shows the block diagram of a fully-connected beamformer. Hybrid beamforming may follow a linear approach where the precoding matrix can be decomposed as $F = F_{RF} F_B$. In this notation, $F_{RF}$ and $F_B$ present the RF beamformer and the baseband precoding matrices, respectively. The elements of $F_{RF}$ are in the form of $F_{RF,n,m} = e^{j\theta_{n,m}}$ where $\theta_{n,m}$ denotes the phase of the (n,m)-th phase shifter. In such a hybrid beamforming approach, the beamformer may be designed such that $\|F_D - F_{RF} F_B\|^2$ is minimized subject to the constant modulus constraints that are imposed by the phase shifters, where $\|\cdot\|$ denotes Frobenius norm. When $F = F_{RF} F_B$ is used, the spatial multiplexing gain of the system will be limited to the rank of $H_e = H F_{RF}$.

As a performance benchmark for such hybrid beamforming methods, we consider a scenario where U=M, and apply a near-optimal approach where the hybrid beamformer is set according to $$\begin{cases} F_{RF,n,m} = e^{-j\angle H_{m,n}}, \\ F_B = (HF_{RF})^{-1}. \end{cases} \quad \text{(eq. 1)}$$

Techniques of the present disclosure can provide significantly higher sum-rates due to achieving a larger spatial multiplexing gain. Hence, the approach in (eq. 1) can considered as a performance lower-bound in evaluations although it may be a near-optimal approach in the context of linear hybrid beamforming.

In some embodiments, a beamformer of the present disclosure can provide spatial multiplexing gain which is related to min(U,N)=U, compared with min(U,M) in a conventional hybrid beamformer. The system performance remains the same if $\|y_D - y_H\|^2 = 0$ where $y_H$ is the received signal vector from a transmitter with hybrid beamforming architecture. For a given channel and noise realization, this is equivalent to $\|x_D - x_H\|^2 = 0$. Techniques of the present disclosure provide a method a transmission intended to minimize $\|x_D - x_H\|^2$.

In some embodiments, a beamformer design in provided such that the Euclidean distance between the transmit signal sent by the hybrid system and a digital system is minimized.

System Design

Let $\hat{x}_D$ and $\|x_D\|$ present the unit vector and magnitude of $x_D$, i.e. let $\hat{x}_D = x_D / \|x_D\|$. Since $\|\hat{x}_D\| = 1$, it can be easily concluded that $|\hat{x}_{D,n}| \leq 1$. As a result, each element of $\hat{x}_D$ can be decomposed as $$|\hat{x}_{D,n}| e^{j\angle x_{D,n}} = e^{j\angle x_{D,n}} \cos(\cos^{-1}(|\hat{x}_{D,n}|)) = \quad \text{(eq. 2)}$$

$$\frac{e^{j\angle x_{D,n}} e^{j(\cos^{-1}(|\hat{x}_{D,n}|))}}{2} + \frac{e^{j\angle x_{D,n}} e^{-j(\cos^{-1}(|\hat{x}_{D,n}|))}}{2} = \frac{1}{2}$$

$$e^{j\angle x_{D,n} + j(\cos^{-1}(|\hat{x}_{D,n}|))} + \frac{1}{2} e^{j\angle x_{D,n} - j(\cos^{-1}(|\hat{x}_{D,n}|))},$$

where each of the exponential terms and the addition operator in the last line can be viewed as combining the output of two phase shifters.

In an embodiment, the phase of the RF beamformer may be set to create the unit vector $\hat{x}_D$; and the baseband coefficient may adjust the signal level according to $\|x_D\|$.

A phase shift of the analogue phase shifters may be set as:

$$\begin{cases} F_{RF,n,1}(H, s) = e^{j\angle \hat{x}_n + j\cos^{-1}(|\hat{x}_n|)} \\ F_{RF,n,2}(H, s) = e^{j\angle \hat{x}_n - j\cos^{-1}(|\hat{x}_n|)} \end{cases} \quad \text{(eq. 3)}$$

A proposed transmit vector $x_{Prop.}$ may be written in the form of $$x_{Prop.} = \|x_D\| \hat{x}_D = \frac{\|x_D\|}{2} (f_{RF,1} + f_{RF,2}) = \frac{\|x_D\|}{2} f_{RF,1} + \frac{\|x_D\|}{2} f_{RF,2} \quad \text{(eq. 4)}$$

Figure 3:
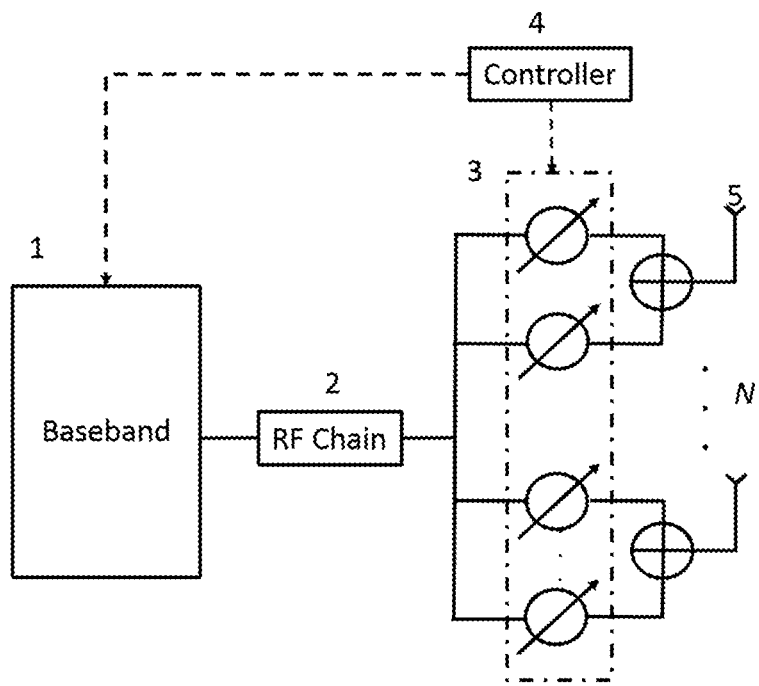
FIG. 3 is apparatus of an analogue beamformer with two phase shifters per antenna.
Figure 4:
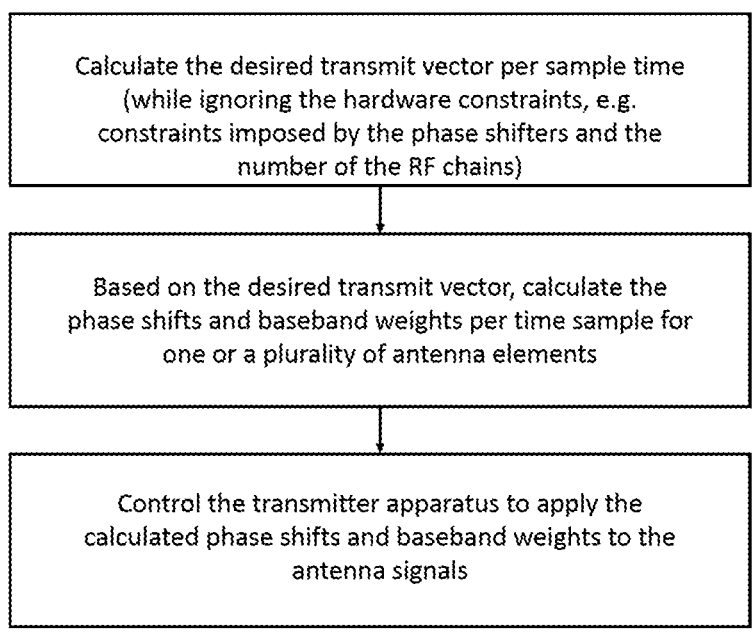
FIG. 4 is a flowchart showing a beamforming method to create signals at the transmitter antennas according to the invention.

Based on the left hand side of the last equality, the structure of FIG. 3 may be used by setting the output of the single RF chain as $F_B(H,s) = \|x_D\|/2$. The right hand side of the last equality in (eq. 4) may be considered equivalent to a fully-connected hybrid beamformer with M=2.

Where $f_B = [0.5 \cdot 0.5]^T \|x_D\|$ denotes the signal vector at the output of the baseband beamformer, then:

$$x_{Prop.}(H,s) = F_{RF}(H,s) f_B^{M \times 1}(H,s) \quad \text{(eq. 5)}$$

For the sake of notation simplicity in the following, (H,s) is omitted for the parameters in (eq. 5).

The method outlined above can result in $\|x_D - x_{prop}\|^2 = 0$, and consequently $\|y_D - y_{Prop.}\|^2 = 0$. Hence, compared to conventional approaches which can only support up to M streams, methods of the present disclosure can achieve the exact performance of a fully-digital system to support a flexible number of users N≥U.

Figure 2:
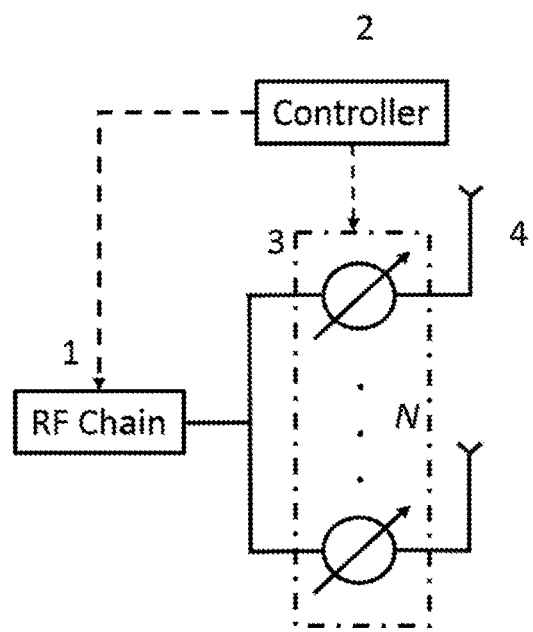
FIG. 2 is apparatus of an analogue beamformer with one phase shifters per antenna.

This principle can be applied to the context of the conventional analogue beamformer shown in the block diagram in FIG. 2. First, the desired signal vector may be calculated and then the phase of the phase shifter on the n-th antenna may be set equal to the phase of $x_{D,n}$. The transmit vector $x_D$ may be designed so that all of its elements have exactly the same magnitude, and so analogue and digital beamformers may achieve the same performance, i.e. $\|x_D - x_H\|^2 = 0$.

Figure 9:
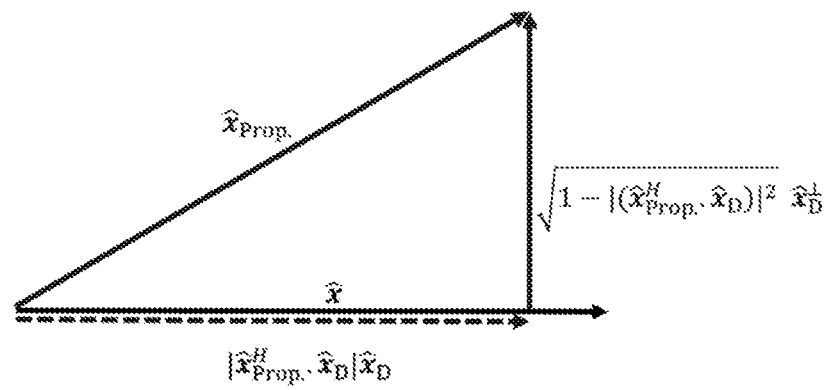
FIG. 9 presents a visualization of the unit vectors created by digital beamformer and the proposed approach.

As such, using analogue phase shifters, a transmit vector can be designed such that the Euclidean distance between $\hat{x}_{prop.}$ and $\hat{x}_D$ becomes zero. When analogue phase shifters are available, equation (eq. 3) results in an optimum set of weights for $f_{RF,1}, f_{RF,2}$ and $f_{B,1}=f_{B,2}=0.5\|x_D\|$ as the baseband signal is equally distributed between two branches of the RF beamformer. In some embodiments, when digital phase shifters are used, the unit transmit vector $\hat{x}_{prop.}$ may be substantially aligned with that of digital beamformer $\hat{x}_D$, as shown in FIG. 9. In this respect, $\|\hat{x}_{Prop}-\hat{x}_D\|^2$. (eq. 6) may be minimised.

In an embodiment, the first column of the RF beamforming matrix is first aligned with digital phase shifters, denoted as $f_{RF,1}^{DPS}$, with $f_{RF,1}$ from (eq. 3), i.e. minimize $\|f_{RF,1}-f_{RF,1}^{DPS}\|^2$. A low-complexity rounding approach may be used by setting $\angle F_{RF,n,1}^{DPS}= \mathcal{Q}\,(F_{RF,n,1})$ where $\mathcal{Q}\,(F_{RF,n,m})$ is defined as:

$$\mathcal{Q}(F_{RF,n,m}) = \arg\min_{\theta}|\angle F_{RF,n,m} - \theta|, \quad \text{(eq. 7)}$$

$$\left(\text{subject to } \theta \in \{0, \ldots, (2^Q-1)2\pi/2^Q\}\right)$$

It is noted that (eq. 7) is equivalent to rounding the analogue phases to the closest discrete phase values that is available to the digital phase shifter. To align $\hat{x}_{prop.}$ with $\hat{x}_D$, the second column of the RF beamformer may be set such that $$f_{B,2}f_{RF,2}^{DPS}= \mathcal{Q}\,(x_D-f_{B,1}f_{RF,1}^{DPS}),$$
where $f_{B,1}=f_{B,1}=0.5\|x_D\|$.

The proposed transmit vector may be $\hat{x}_{Prop.}=f_{B,1}F_{RF,1}^{DPS}+f_{B,2}f_{RF,2}^{DPS}$.

In general, a hybrid beamformer comprises M>1 RF chains and digital phase shifters with Q bits of resolution. Each $f_{RF,m}^{DPS}$, i.e. the m-th column of $F_{RF}^{DPS}$, may represent a vector that includes the beamforming weights of the m-th phased array which is connected to the m-th RF chain. The transmit signal may be:

$$x_{Prop.}^{DPS}=F_{RF}^{DPS}f_B^{DPS}=\Sigma_{m=1}^{M}f_{B,1}f_{RF,m}^{DPS}.$$

A method to find the beamforming weights that minimize (eq. 6) is presented in Algorithm 1. The RF beamformer may be configured to align the unit vector in the desired direction. In Algorithm 1, the weights of $f_{RF,m}^{DPS}$ are sequentially calculated to reduce the remaining error $x_D-F_{RF,1:m-1}^{DPS}[f_{B,1}, \ldots, f_{B,m-1}]^T$. Once the direction of $f_{RF,m}^{DPS}$ is calculated, the baseband weights $[f_{B,1}, \ldots, f_{B,m}]^T$ may be updated by minimising $\|x_D-F_{RF,1:m-1}^{DPS}[f_{B,1}, \ldots, f_{B,m-1}]^T\|$.

Then, a least squares approach is used to calculate the updated $[f_{B,1}, \ldots, f_{B,m}]$.

---

Algorithm 1
Calculate the beamforming weights for the fully-connected structure

1. Input $x_D = \|x_D\|\hat{x}_D$
2. Calculate $f_{RF,1}$ according to (eq. 3),
3. Calculate $f_{RF,1}^{DPS} = e^{j\mathcal{Q}(f_{RF,1})}$ according to (eq. 7),
4. Define $t = f_{B,1}f_{RF,1}^{DPS}$ where $f_{B,1} = 0.5$,
5. For $2 \le m \le M$ do
6. $f_{RF,m}^{DPS} = e^{j\mathcal{Q}(\hat{x}_D - t)}$
7. $f_{B,1:m} = (F_{RF,1:m}^{DPS^H}F_{RF,1:m}^{DPS})^{-1} F_{RF,1:m}^{DPS}\hat{x}_D$

---

Algorithm 1
Calculate the beamforming weights for the fully-connected structure

8. $t = F_{RF,1:m}^{DPS}f_{B,1:m}$
9. End for

10. Return $x_{Prop.} = \dfrac{\|x_D\|t}{\|t\|}$

---

In order to evaluate the performance of this method, first consider the performance of a fully-digital beamformer. Depending on the choice of the digital beamformer, the received signal vector can be decomposed into:

$$y_D=y_D^{Desired}+y_D^{Interference}+Z$$

where $y_D^{Desired}$ and $y_D^{Interference}$ represent the desired signal and interference vectors at the user equipment, respectively. Then, the rate for each user is related to its signal-to-interference-plus-noise ratio (SINR) for a given channel matrix and the system sum-rate is:

$$R_{Prop.} = \sum_{u=1}^{U}\log_2\left(1 + \frac{E_s[|y_{D,u}^{Desired}|^2]}{1+E_s[|\alpha y_{D,u}^{Int.}|^2]}\right)$$

where $E_s[\cdot]$ denotes the expected value with respect to s.

When a beamformer with digital phase shifters is used, the unit vector of the transmit signal by our proposed method can be written as:

$$\hat{x}_{Prop.}=|\hat{x}_{Prop.}^H\hat{x}_D|\hat{x}_D+\sqrt{1-|\hat{x}_{Prop.}^H\hat{x}_D|^2}\hat{x}^{\perp}$$

where $\alpha=|\hat{x}_{Prop.}^H\hat{x}_D|$ is projection of $\hat{x}_{Prop.}$ in the direction of the optimal unit vector $\hat{x}_D$ by the digital beamformer.

On the other hand, $\sqrt{1-|\hat{x}_{Prop.}^H\hat{x}_D|^2}\hat{x}^{\perp}$ represents the unwanted deviation vector from $\hat{x}_D$ which causes an unwanted interference. To be more precise:

$$y = \sqrt{\rho}\,\|x_D\|H\hat{x}_{Prop.}+z = \sqrt{\rho}\,\|x_D\|H(\alpha\hat{x}_D + \sqrt{1-\alpha^2}\,\hat{x}^{\perp})+z$$

$$= \alpha\sqrt{\rho}\,\|x_D\|H\hat{x}_D + \sqrt{\rho}\,\left\|\sqrt{1-\alpha^2}\,x_D\right\|\hat{x}^{\perp}+z$$

$$= \alpha(y_D^{Desired}+y_D^{Interference})+w+z$$

where $w=\sqrt{\rho(1-\alpha^2)}\|x_D\|H\hat{x}^{\perp}$ denotes the interference vector that is introduced by the imperfection of the phase shifters.

In a performance evaluation, interference may be considered as additive noise. Hence, the total sum-rate by the proposed method compared to that of fully-digital beamformer may be expressed as:

$$R_{Prop.} = \sum_{u=1}^{U}\log_2\left(1 + \frac{E_s[|\alpha y_{D,u}^{Desired}|^2]}{1+E_s[|\alpha y_{D,u}^{Int.}|^2]+E_s[|w_u|^2]}\right)$$

We note that $y_D^{Interference}=0$ when a zero forcing precoder is used.

In this respect, techniques of the present disclosure require only a single RF chain, M=1, adder and splitter and two phase shifters per antenna element to exactly achieve the same performance as a fully-digital beamformer with N=M antennas and RF chains. In contrast to the existing methods, this=approach can efficiently eliminate the PAPR problem for all components in the circuit. Moreover, it can provide spatial multiplexing gains that are related to the number of the antennas N rather than the number of the RF chain(s) M. Unlike outphasing MIMO, the array size can be scaled up while all phase shifters operate at the same power levels; and power amplifiers can be distributed across the array and signals can be created such that the amplifiers operate with constant PAPR. This approach benefits from lower computational and hardware complexity compared to existing methods and it works well with both digital and analogue phase shifters to support larger number of transmit streams than number of the RF chains. The proposed approach can also be applied in the existing fully-connected hybrid beamforming structures.

Unlike the ESPAR and load modulated approaches; the approach does not impose a limit on the array geometry or size, e.g., to be very small or very large. Since the use of standard RF components, such as phase shifters and RF dividers, solves many of the challenges in the implementation of the star-point; the approach also avoids the problems with the matching circuit and the return signals that were reported with load modulated.

Compared to outphasing MIMO, the approach can create any desired signal in a much more computationally efficient manner and with a much simpler hardware requirements. In particular, we show that by using a single RF chain and two phase shifters per antenna, the method can exactly create any desired signal. As a result, the number of the phase shifters required is 2N compared to $N+\Sigma_{n=1}^{K} 2^n$ where $K=\log_2 N$.

This reduction in the number of the phase shifters, not only reduces the number of the phase shifters, RF track and connections, and the hardware requirements to control the phase shifters; but also it reduces the computation requirements to calculate the desired phases for each phase shifter. Unlike outphasing MIMO methods, where using high resolution phase shifters significantly increases the computational complexity, the method can efficiently achieve the optimal performance if the transmitter is equipped with analogue phase shifters or high resolution phase shifters. Even if there are digital phase shifters in the system, a low-complexity and adaptive approach is provided to calculate the phases without the need for a look up table. In addition, the failure of one or a few phase shifters does not have a major impact on the system performance unlike outphasing MIMO.

Embodiments of the present disclosure thus provide a low-complexity, low-cost method to create a desired complex-valued signal in wireless transmitters.

Compared with existing hybrid beamforming methods, where the RF beamforming matrix includes the weights of the phase shifters, and is solely designed according to the channel matrix, we propose to create the transmit signal by changing the RF beamforming coefficients according to both channel matrix and the transmit symbols to alleviate the need for multiple RF chains.

A transmission scheme is provided for a transmitter with a single RF chain M=1 and multiple antennas where each antenna is equipped with L=2 phase shifters (or any other electrical component that provides a phase shift). This system can provide a flexible spatial multiplexing gain which is greater than M=1 to support U≥1 users. In particular, this approach with a single RF chain can achieve the exact same performance of a fully-digital system with much larger number of RF chains. Techniques of the present disclosure may be implemented by using any physical realisation of signal splitting, combining and phase shifting effects; for example, any electrical components that provide such effects can be used.

When the transmitter is equipped with a single RF chain and two analogue phase shifters per antenna, the exact same performance of a fully-digital beamformer can be achieved. The proposed approach also provides an improved performance even for systems with a single RF chain and digital phase shifters of limited resolution. The approach can also be applied in the existing fully-connected hybrid beamformers, which have more than one RF chain, and outperforms existing methods by allowing for the transmission of larger number of transmit streams compared to the RF chains.

Techniques of the disclosure enable PAPR reduction (or even elimination) without necessarily distorting the signal, or by using dedicated signal processing.

Existing methods are not able to effectively solve high PAPR problem for all circuit components. Although the PAPR of the input signal to the power amplifier may be reduced, the PAPR problem still exists for each of the components before the antennas, e.g., loads, phase shifters. All the phase shifters or loads need to be able to handle high amount of power, and the use of an expensive high-cost high-power amplifier and RF components may be require. The approach disclosed, on the other hand, offers the flexibility to insert power amplifiers at multiple stages throughout the circuit which allows for bringing the power levels that are adequate to run each phase shifter.

The approach is applicable to both single-antenna and multi-antenna systems. However, for the sake of the clarity and without loss of generality, the following focuses only on a single antenna transmitter. Consider a conventional single-input single-output system where the received signal y is expressed as:

$$y = hx' + z = \sqrt{P_{max}} hx + z,$$

where $P_{max}$, h, z, x' and x denote the maximum transmit power, channel coefficient, noise, transmit signal and its normalized value such that $|x| \leq 1$, respectively In the following, the proposed approach can be applied to the structures in FIGS. 7 and 8. The phase shifters may be set such that $$\frac{\sum_{l=0}^{L-1} e^{j\theta'_l}}{L} = x$$

where $\theta_l'$ is the phase of the l-th phase shifter. Dividing both sides with $e^{j\angle x}$ and defining $\theta_l = \theta_l' - \angle x$, the problem is equivalent to:

$$|Lx| = \sum_{l=0}^{L-1} e^{j\theta_l} = L\sum_{l=0}^{L-1}(\cos(\theta_l) + j\sin(\theta_l)) = L\sum_{l=0}^{L-1}\cos(\theta_l), \quad (eq.\ 8)$$

where the last equality must hold as $|x|$ is a real number. It can be verified that this nonlinear equation with L unknown variables does not have a unique solution. In order to find a solution and to convert the problem into a familiar problem, impose additional constraints on $\theta_l$ such that:

$$\begin{cases} \theta_l = \theta_0 + l\Delta \\ \sin\left(\frac{\Delta}{2}\right) \neq 0 \end{cases} \quad (eq.\ 9)$$

This converts the set of equations $\Sigma_{l=0}^{L-1} \cos(\theta_l) = |Lx|\$ and $\Sigma_{l=0}^{L-1} \sin(\theta_l) = 0$ with L unknowns into a problem with only two unknowns $\theta_0$ and $\Delta$. Replacing (eq. 9) into (eq. 8), the real and imaginary parts of (eq. 8) can be written as:

$$\begin{cases} \sum_{l=0}^{L-1} \cos(\theta_0 + l\Delta) = v\cos\left(\theta_0 + \frac{(L-1)\Delta}{2}\right), \\ \sum_{l=0}^{L-1} \sin(\theta_0 + l\Delta) = v\sin\left(\theta_0 + \frac{(L-1)\Delta}{2}\right), \end{cases}$$

where $v = \sin(N\Delta/2)/\sin(\Delta/2)$.

A solution to set the second line in the equation above to zero is $\theta+0=-(L-1) \Delta/2$ As a result, the first line turns into:

$$\sum_{l=0}^{L-1} \cos(\theta_0 + l\Delta) = \frac{\sin\left(L\frac{\Delta}{2}\right)}{\sin\left(\frac{\Delta}{2}\right)} = |Lx|$$

It can be verified that there is a one-to-one mapping between $\Delta$ and $|Lx|$ when $0 \leq \Delta \leq \pi/N$ and $\Delta$ can be numerically found. Hence, a solution to (eq. 8) is found which allows for using multiple phase shifters and simpler amplifiers in FIG. 8.

Figure 7:
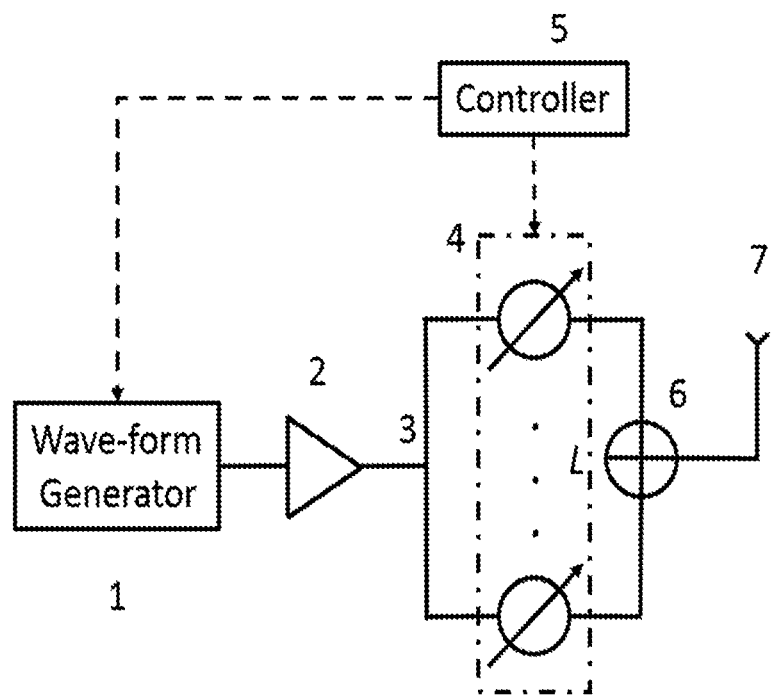
FIG. 7 is an apparatus which reduces the peak-to-average power ratio of the input signal to the power amplifier.
Figure 8:
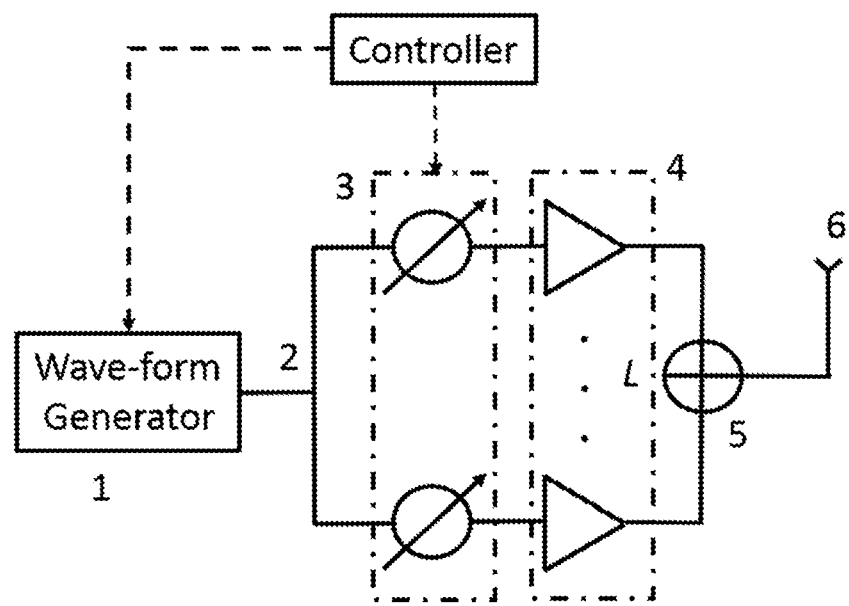
FIG. 8 is an apparatus which reduces the peak-to-average power ratio of the input signal to the power amplifier.

The proposed structure in FIG. 7 may only require one power amplifier but it also needs phase shifters which can operate at higher power levels compared to the FIG. 8.

On the other hand, FIG. 8 requires larger number of power amplifiers where each of them needs to generate lower power compared to FIG. 7. As a result, the energy efficiency of each power amplifier will be improved and low-power phase shifters can be used. Investigating the exact trade-offs in terms of cost and energy efficiency is of great interest as a future research direction. After the splitters in the RF circuit, especially in FIG. 8, additional amplifiers might be required to being the power levels to satisfactory levels depending on the phase shifters input power requirements.

In order for the approach to create a desired signal with bandwidth W, the phase shifters need to change their phases at least as fast as the sampling time of the signal $T_s=1/W$ such that $T_{PS} \leq T_s$ where $T_{PS}$ denotes the switching time of the phase shifters. Based on the current state of phase shifter's technology, their switching time can be as fast as 1 ns. This means that signals with bandwidth of up to 1 GHz can be supported. Switching time refers to the time period that the phase shifter can be programmed to switch from one phase to another. During the transition periods (settling time of the phases) from one phase to another, there might be out of band emissions. To overcome this, some extra circuit components, such as filters, might be required.

In this disclosure, two approaches may build a fast phase shifting effect with slower phase shifters. In the first method, shown in FIG. 5, this is achieved by cascading several low-speed phase shifters. In the second method, shown in FIG. 6, several slow phase shifters are placed in parallel and a switch is used to select the phase shifter with desired phase. In this approach, the switch must be able to select the phase sifter that provides the desired phase shift at the intended time index.

Figure 5:
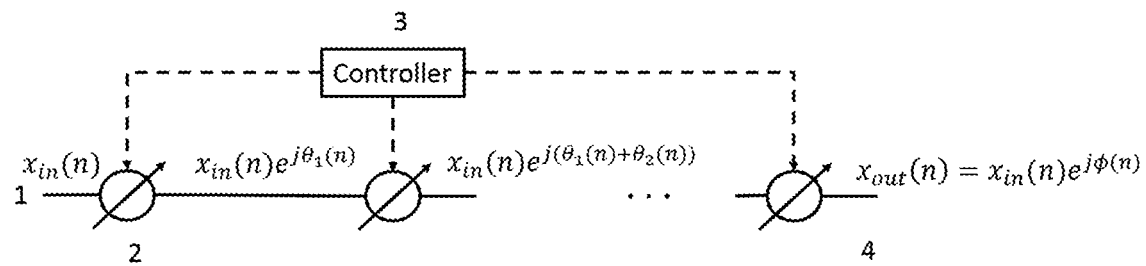
FIG. 5 is an apparatus which can be used to provide faster phase shifting effect compared to each phase shifter.

To explain the key idea behind both structures, the integer number $$N' = \left\lceil \frac{T_{PS}}{T_S} \right\rceil$$

is defined as an indicator of the required switching speed of the phase shifter. For example, if $T_{PS}=N'T_S$, then N' samples of signal will pass through the phase shifters during the time $T_{PS}$ until the phase shifters can change their phase. By using N'-times larger number of phase shifters, we create structures in which each of the phase shifters can still switch every $T_{PS}=N'T_S$, while the overall phase shifting effect is $T_S$. In FIG. 5, we use N' phase shifter which are placed serially and their switching time is N'-times slower than the required sampling time.

Each of the phase shifters is labelled with an integer number $i \in \{1, \ldots, N'\}$ from the left hand side of FIG. 5. The phase shift by the first and last phase shifters are denoted by $\theta_1$ and $\theta_{N'}$, respectively. To provide a desired amount of phase shift $\phi(n)$ to the input signal $x_{in}(n)$ at time index n, i.e., to set the output signal according to $x_{out}(n)=x_{in}(n)e^{j\phi(n)}$, the phase shifters in FIG. 5 should be set so that $$e^{j\phi(n)} = e^{j\sum_{i=1}^{N'}\theta_i(n)}.$$

At time index n, the controller updates the phase of only one of the phase shifters according to the following pseudo-code:

Algorithm 2

Calculate the phases for the phase shifters in FIG. 5 to achieve faster phase shifting effect (all angles are expressed in radians)

1. Input n, $\phi(n)$, $x_{in}(n)$
2. Initialise $\theta_1(0) = \theta_2(0) = \ldots = \theta_{N'}(0)$,
3. Idx = n mod N'
4. If Idx ==0,
   a. Idx = N'
5. $\theta_{Idx} = (\phi(n) - \Sigma_{i \neq Idx}{}^n\theta_i(n)) \mod 2\pi$ To clarify this method, consider the following example with $T_{PS}=4T_S$. For the sake of simplicity and without loss of generality, the resolution of the phase shifters is assumed to be one degree and all the angles in the following are expressed in degrees. In this example, the first phase shifter switches at time indexes n=1, 5, 9, . . . , and the second, third and fourth phase shifters switch their phase at times 2, 6, 10, 14, . . . , and 3, 7, 11, 15, . . . , and 4, 8, 12, 16, . . . , respectively. The phase of all of the phase shifters are initially set to zero. In the following table, a set of phases for each phase shifter achieve a desired phase shift at a specific time index:

TABLE 1

Example for achieving 4 times faster phase shifting effecting based on FIG. 5, the boldface numbers indicate that the controller updates the corresponding phase shifter.

| | $\theta_1(n)$ | $\theta_2(n)$ | $\theta_3(n)$ | $\theta_4(n)$ | $\phi(n) = \sum_{i=1}^{N'} \theta_i(n) \mod 360$ |
|---|---|---|---|---|---|
| n = 1 | 5 | 0 | 0 | 0 | 5 |
| n = 2 | 5 | 15 | 0 | 0 | 20 |
| n = 3 | 5 | 15 | 344 | 0 | 4 |
| n = 4 | 5 | 15 | 344 | 86 | 90 |
| n = 5 | 45 | 15 | 344 | 86 | 120 |
| n = 6 | 45 | 255 | 344 | 86 | 10 |
| n = 7 | 45 | 255 | 4 | 86 | 30 |
| n = 8 | 45 | 255 | 4 | 56 | 0 |
| n = 9 | 62 | 255 | 4 | 56 | 17 |

Figure 6:
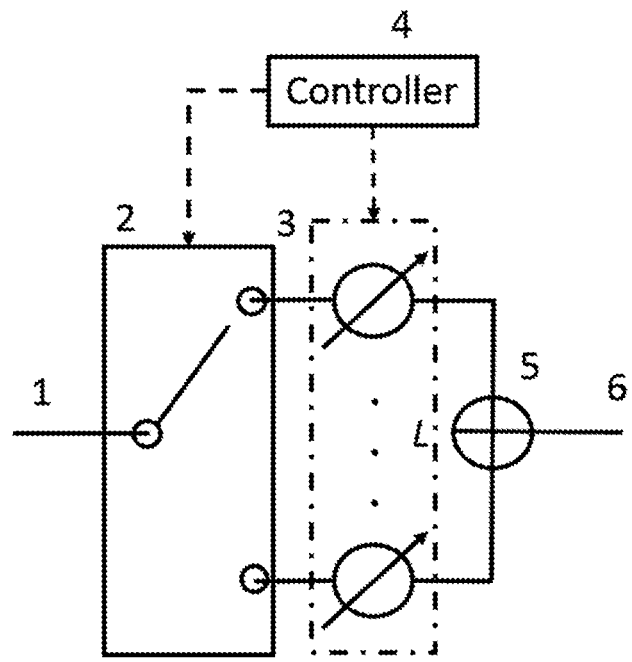
FIG. 6 is an apparatus which can be used to provide faster phase shifting effect compared to each phase shifter.

In FIG. 6, a selector, which can switch every $T_s$ seconds, is connected to N' phase shifters. Each of the phase shifters will still change its phase at every $T_{PS}$ seconds while the overall phase shifting effect takes place every $T_s$ seconds. Algorithm 3 in the following presents the procedures to achieve faster phase shifting effect via the structure in FIG. 6.

Algorithm 3

Calculate the phases for the phase shifters in
FIG. 6 to achieve faster phase shifting effect 6. Input n, ϕ(n), $x_{in}$(n)
7. Initialise $\theta_1$(0) = $\theta_2$(0) = ... = $\theta_{N'}$(0),
8. Idx = n mod N'
9. If Idx ==0,
   a. Idx = N'
10. $\theta_{Idx}$ = ϕ(n)

Similarly to Table 1, consider the following example to clarify the operation of the proposed method:

TABLE 2

Example for achieving 4 times faster phase shifting effecting based on FIG. 6, the boldface numbers indicate that the controller updates the corresponding phase shifter.

| | $\theta_1$(n) | $\theta_2$(n) | $\theta_3$(n) | $\theta_4$(n) | ϕ(n) = $\theta_i$(n), where i = n mod N' |
|---|---|---|---|---|---|
| n = 1 | 5 | 0 | 0 | 0 | 5 |
| n = 2 | 5 | 20 | 0 | 0 | 20 |
| n = 3 | 5 | 20 | 4 | 0 | 4 |
| n = 4 | 5 | 20 | 4 | 90 | 90 |
| n = 5 | 120 | 20 | 4 | 90 | 120 |
| n = 6 | 120 | 10 | 4 | 90 | 10 |
| n = 7 | 120 | 10 | 30 | 90 | 30 |
| n = 8 | 120 | 10 | 30 | 0 | 0 |
| n = 9 | 17 | 10 | 30 | 0 | 17 |

For each sample of the signal, the selector chooses the phase shifter which provides the required phase shift to the input signal. Combinations of the structures in FIG. 5 and FIG. 6 can also be used in single-antenna and multi-antenna systems to increase the phase shifting speed with slower phase shifters.

Performance of the proposed method can evaluated in terms of achievable sum-rate and system throughput by using Monte-Carlo simulations over 1000 channel realizations. For the sake of simplicity, fully-digital zero forcing precoder is the performance upper-bound to and a hybrid beamforming design with analogue phase shifters is the lower-bound. To represent rich and sparse scattering environment, the channel matrix is modelled by narrowband i.i.d. Rayleigh fading with $H_{u,n} \sim \mathcal{CN}(0, 1)$ and a geometry based model with T multipath components, respectively. For the latter, the channel vector for the u-th user is expressed as $$h_u = \frac{\sqrt{N}}{\sqrt{T}} \sum_{t=1}^{T} \beta_{u,t} a^H(\phi_{u,t}),$$

where $\beta_{u,t} \sim \mathcal{CN}(0, 1)$ and $\phi_{u,t}$ are the multipath coefficient and angle-of-departure of the t-th multipath, respectively.

The steering vector $\alpha(\phi_{u,t})$ for linear arrays is expressed as:

$$a(\phi_{u,t}) = \frac{1}{\sqrt{N}}\left(1, e^{\frac{j2\pi d\cos(\phi_{u,t})}{\lambda}}, \ldots, e^{\frac{j2\pi d(N-1)\cos(\phi_{u,t})}{\lambda}}\right)^T,$$

where $\phi_{u,t} \in [0,\pi]$, $\lambda$ is the wavelength and d is the antenna spacing and it is set to half wavelength, i.e. d=$\lambda$/2.

Figure 10:
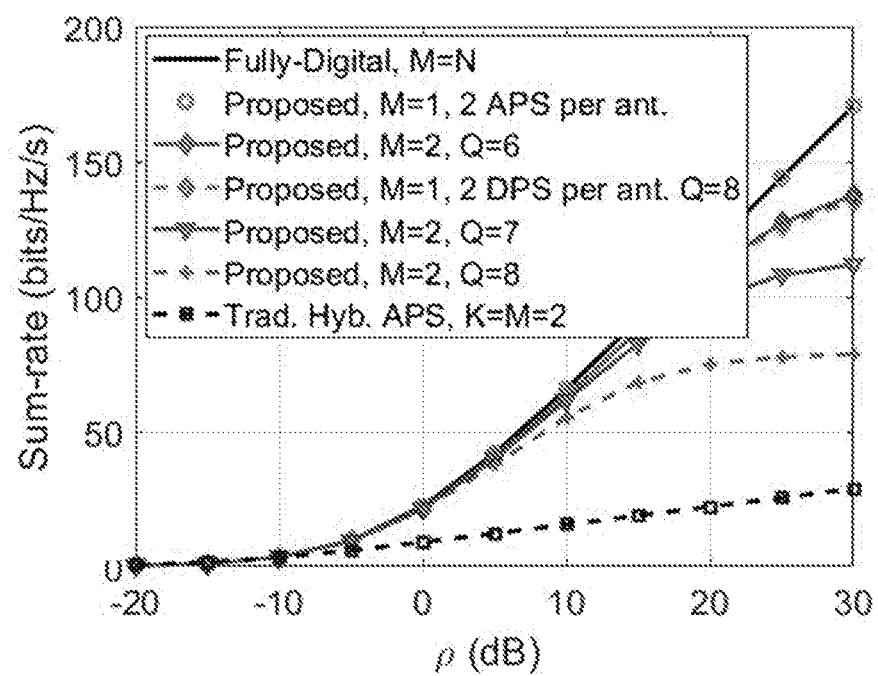
FIG. 10 presents the simulations results for the achievable sum-rates.

FIG. 10 illustrates the impact of the resolution of the phase shifters on the achievable sum-rates by the proposed schemes over sparse scattering channel model with T=3 and N=64, U=16.

Figure 11:
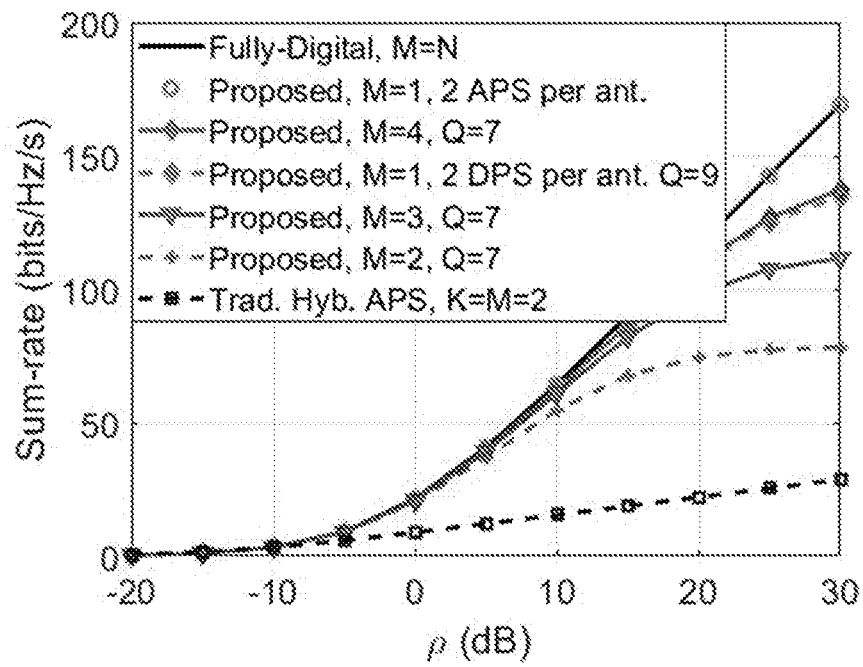
FIG. 11 presents the simulations results for the achievable sum-rates.

FIG. 11 shows that there is a significant performance gain compared to the traditional approach where only U=M=2 users are served [9]. Moreover, the exact same performance of fully-digital zero forcing is achieved by the structure of FIG. 3, i.e. an analogue beamformer with 2 analogue phase shifters (APS) per antenna. According to FIG. 10, using digital phase shifters (DPS) in this structure may result in performance saturation at the high SNR regime.

FIG. 11 also shows that the sum-rate by the fully-connected structure of FIG. 1 with M=2 RF chains and digital phase shifters with Q=6 bits of resolution is almost the same as the structure of FIG. 3 with M=1 and Q=8. This indicates that in order to increase the data rates, one can either use phase shifters with higher resolution or use a larger number of RF chains.

It is noted that as ρ increases, the impact of misalignment between the transmit vectors by our proposed method with digital phase shifters and by digital zero forcing becomes more noticeable as the misalignment is causing interference among the users.

Figure 12:
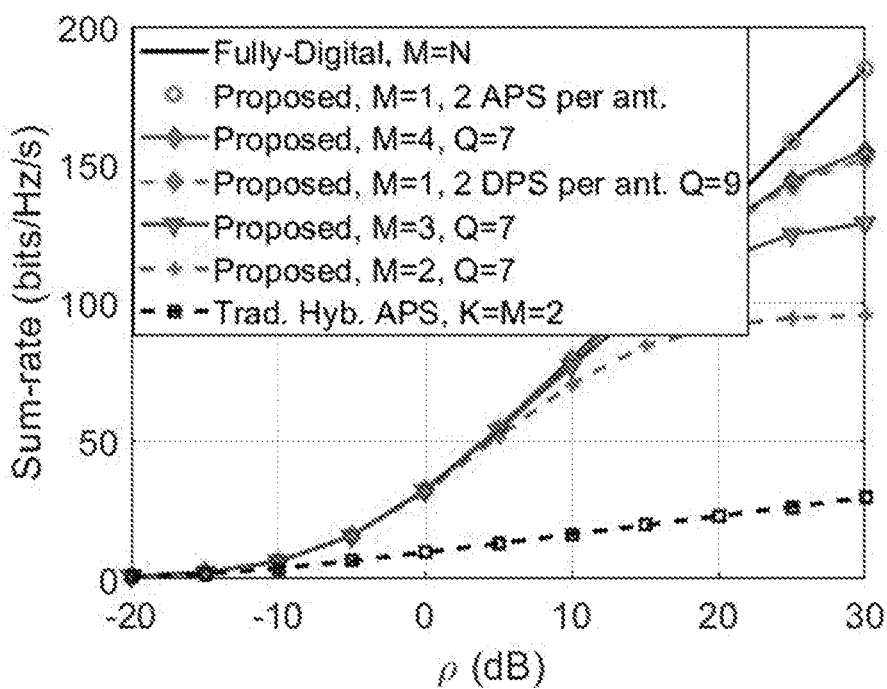
FIG. 12 presents the simulations results for the achievable sum-rates.

FIG. 11 presents the system performance for different numbers of RF chains over sparse scattering channel. FIG. 11 indicates that increasing the number of the RF chains for a given phase shifter resolution improves the performance. Our method outperforms the conventional design by a huge margin, i.e. almost more than 3 times higher sum-rate at ρ=20 dB. Fig. Similar trends are observed for rich scattering channels as shown in FIG. 12.

The skilled person will appreciate that a number of modifications may be made to the embodiments described above, which fall within the scope of the present invention, as defined by the claims. Practical implementation of this invention may require additional processing/extra circuit components to compensate for imperfections/distortions that may happen due to physical limitations of the components. For example, algorithms/filters may be required to compensate the out-of-band emissions or distortions in signals which can be caused due to fast phase shifting effects in a practical system.

Features of various compatible embodiments may be combined. The skilled person will be able to appreciate, from the teaching described, the extent to which such features can be interchanged while achieving the effects of the present invention.

What is claimed is:
1. A method of transmitting a wireless signal using a beamforming apparatus having a plurality of antennas, the method comprising:
   generating a first RF signal; and
   transmitting, using the plurality of antennas, a respective plurality of output RF signals to form the transmitted wireless signal;
   wherein transmitting the plurality of output RF signals comprises, for each antenna:
   splitting the first RF signal into a pair of second RF signals;

shifting a phase between each of the pair of second RF signals;

adding the phase shifted pair of second RF signals to form a third RF signal, wherein shifting the phase is based on a desired vector for the third RF signal, and wherein, for each antenna, the phase shift is selected such that vector average of the second RF signals is substantially aligned with a desired direction of the desired vector for the third RF signal; and transmitting, using the antenna, the third RF signal as the respective output RF signal for the antenna.

2. The method of claim 1, wherein the desired vector is determined based on a beam forming calculation for the plurality of antennas.

3. The method of claim 1, wherein, for each antenna, shifting the phase comprises:

determining a desired phase shift based on the desired vector for the third RF signal;

determining an applicable phase shift by identifying a discrete phase shift available to a digital phase shifter which is nearest to the desired phase shift; and shifting the phase by the applicable phase shift using a digital phase shifter.

4. The method of claim 1, further comprising adjusting a baseband coefficient of the first RF signal.

5. The method of claim 1, further comprising amplifying the first RF signal before splitting the first RF signal, wherein shifting the phase between each of the pair of second RF signals for each antenna is based on a desired envelope of the plurality of output signals.

6. The method of claim 1, further comprising amplifying each of the third RF signals prior to transmitting the plurality of output signals.

7. The method of claim 1, wherein shifting the phase between each of the pair of second RF signals for each antenna comprises shifting the phase using each of a plurality of phase shifters arranged in series.

8. The method of claim 7, further comprising sequentially updating the transmitted wireless signal by updating a phase shift applied by each phase shifter in the plurality of phase shifters in sequence.

9. The method of claim 1, wherein shifting the phase between each of the pair of second RF signals for each antenna comprises shifting the phase using one of a plurality of phase shifters arranged in parallel.

10. The method of claim 9, further comprising sequentially updating the transmitted wireless signal by selecting each phase shifter in the plurality of phase shifters in sequence.

11. The method of claim 1, further comprising generating at least one additional first RF signal, wherein a total number of the plurality of antennas is greater than a total number of the first RF signals.

12. A beamforming apparatus for transmitting a wireless signal, comprising:

a baseband signal generator configured to generate a first RF signal;

a plurality of antennas configured to transmit a respective plurality of output RF signals to form the transmitted wireless signal; and for each of the plurality of antennas:

a signal splitter configured to split the first RF signal into a pair of second RF signals;

at least two phase shifters configured to shift a phase between each of the pair of second RF signals;

a signal adder configured to add the phase shifted pair of second RF signals to form a third RF signal and output the third RF signal as the respective output RF signal for the antenna, wherein shifting the phase is based on a desired vector for the third RF signal, and wherein, for each antenna, the phase shift is selected such that vector average of the second RF signals is substantially aligned with a desired direction of the desired vector for the third RF signal.

13. The beamforming apparatus of claim 12, wherein the desired vector is determined based on a beam forming calculation for the plurality of antennas.

14. The beamforming apparatus of claim 12, wherein, for each antenna, shifting the phase comprises:

determining a desired phase shift based on the desired vector for the third RF signal;

determining an applicable phase shift by identifying a discrete phase shift available to a digital phase shifter which is nearest to the desired phase shift; and shifting the phase by the applicable phase shift using a digital phase shifter.

15. The beamforming apparatus of claim 12, wherein a baseband coefficient of the first RF signal is adjusted.

16. The beamforming apparatus of claim 12, further comprising:

a power amplifier configured to amplify the first RF signal before splitting the first RF signal, wherein shifting the phase between each of the pair of second RF signals for each antenna is based on a desired envelope of the plurality of output signals.

17. A beamforming apparatus for transmitting a wireless signal, comprising:

a baseband signal generator configured to generate a first RF signal;

a plurality of antennas configured to transmit a respective plurality of output RF signals to form the transmitted wireless signal; and for each of the plurality of antennas:

a signal splitter configured to split the first RF signal into a pair of second RF signals;

at least two phase shifters configured to shift a phase between each of the pair of second RF signals;

a signal adder configured to add the phase shifted pair of second RF signals to form a third RF signal and output the third RF signal as the respective output RF signal for the antenna, wherein the apparatus further comprises:

a power amplifier configured to amplify the first RF signal before splitting the first RF signal, wherein shifting a respective phase between each of the pair of second RF signals for each antenna is based on a desired envelope of the plurality of output signals.

* * * * *